United States Patent
Liu et al.

(10) Patent No.: US 8,874,059 B2
(45) Date of Patent: Oct. 28, 2014

(54) REDUCING POWER CONSUMPTION ON A RECEIVER

(71) Applicant: QUALCOMM Incorporated, San Diego, CA (US)

(72) Inventors: Li Liu, San Diego, CA (US); Steven C Ciccarelli, San Diego, CA (US); Shrenik Patel, San Diego, CA (US); Prasad Srinivasa Siva Gudem, San Diego, CA (US); Zixiang Yang, San Diego, CA (US); Frederic Bossu, San Diego, CA (US); Wu-Hsin Chen, San Diego, CA (US); Chiewcharn Narathong, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 13/800,846

(22) Filed: Mar. 13, 2013

(65) Prior Publication Data

US 2014/0273901 A1 Sep. 18, 2014

(51) Int. Cl.
*H04B 1/10* (2006.01)
*H04W 52/02* (2009.01)

(52) U.S. Cl.
CPC ................ *H04W 52/0238* (2013.01)

USPC ......... 455/245.1; 455/254; 455/296; 455/307

(58) Field of Classification Search
USPC ............ 455/63.1, 67.11, 226.1, 234.1, 245.1, 455/254, 296, 307, 334; 375/346, 349
See application file for complete search history.

(56) References Cited

U.S. PATENT DOCUMENTS

| | | | |
|---|---|---|---|
| 6,407,689 B1 | 6/2002 | Bazarjani et al. | |
| 6,968,172 B2 | 11/2005 | Saito | |
| 7,460,890 B2 | 12/2008 | Liang et al. | |
| 7,593,491 B1 | 9/2009 | Khlat et al. | |
| 8,208,590 B2 | 6/2012 | Okada et al. | |
| 2005/0227663 A1* | 10/2005 | He | 455/296 |
| 2009/0154620 A1* | 6/2009 | Mostafa | 455/296 |
| 2010/0311381 A1 | 12/2010 | Katsube et al. | |
| 2012/0142284 A1* | 6/2012 | Shi et al. | 455/226.1 |
| 2013/0309989 A1* | 11/2013 | Haub et al. | 455/245.1 |

* cited by examiner

*Primary Examiner* — Thanh Le
(74) *Attorney, Agent, or Firm* — Fountainhead Law Group P.C.

(57) ABSTRACT

A method for reducing power consumption on a wireless communication device is described. The wireless communication device includes a first stage active filter and a second stage active filter. A condition measurement is obtained that includes a signal measurement condition. If it is determined that the condition measurement is above a threshold, the second stage active filter is bypassed.

48 Claims, 11 Drawing Sheets

REDUCING POWER CONSUMPTION ON A RECEIVER

TECHNICAL FIELD

The present disclosure relates generally to communication systems. More specifically, the present disclosure relates to systems and methods for reducing power consumption on a receiver.

BACKGROUND

Wireless communication systems are widely deployed to provide various types of communication content such as voice, video, data and so on. These systems may be multiple-access systems capable of supporting simultaneous communication of multiple mobile devices with one or more base stations.

A subscriber station may include one or more integrated circuits. These integrated circuits may include analog and digital circuitry necessary for wireless communication. Power is consumed when the circuitry is employed. However, there may be instances when circuitry is used when it is not necessary. Thus, unnecessary power is consumed. Therefore, benefits may be realized by more efficiently managing circuit components.

SUMMARY OF THE INVENTION

A method for reducing power consumption on a wireless communication device is described. The wireless communication device includes a first stage active filter and a second stage active filter. A condition measurement is obtained that includes a signal measurement condition. If it is determined that the condition measurement is above a threshold, the second stage active filter is bypassed.

The signal condition measurement may be a wideband signal condition measurement. The condition measurement may be an interference condition measurement. The condition measurement may be a combined condition measurement based on a signal condition measurement and an interference condition measurement. The threshold may be a signal threshold, an interference threshold or a combined signal threshold.

The second stage active filter may include an active stage. Bypassing the second stage active filter may further include disabling power to the active stage and opening a bypass circuit path to bypass the second stage active filter. Opening the bypass circuit path may include closing at least one bypass switch.

An input signal may also be obtained. The input signal may be amplified at the first stage active filter. A filtered signal may be outputted. The input signal may be a differential input signal with an inverted signal and a non-inverted signal. A phase correction may be applied to the input signal if the condition measurement is above the threshold. The phase correction may include crossing over the inverted signal to be the non-inverted signal and crossing over the non-inverted signal to be the inverted signal. At least one additional active filter may be bypassed and have its power disabled if the condition measurement is above the threshold. The input signal may be amplified using a low-noise amplifier. The input signal may be down-converted using a mixer.

A passive filter may be applied after the second stage active filter if the condition measurement is above the threshold. The passive filter may reject out-of-band signals. The condition measurement may be obtained, in part, from an antenna.

A wireless device for reducing power consumption on a wireless communication device is also described. The wireless device includes a first stage active filter and a second stage active filter. The wireless device includes a processor and executable instructions stored in memory that is in electronic communication with the processor. The wireless device obtains a condition measurement that includes a signal condition measurement. The wireless device also determines if the condition measurement is above a threshold. The wireless device further bypasses the second stage active filter if the condition measurement is above the threshold.

A computer-program product for reducing power consumption on a wireless communication device is also described. The computer-program product includes a non-transitory computer-readable medium with instructions thereon. The computer-program product includes instructions to obtain a condition measurement that includes a signal condition measurement. The computer-program product also includes code to determine if the condition measurement is above a threshold. The computer-program product further includes code to bypass a second stage active filter if the condition measurement is above the threshold.

An apparatus for reducing power consumption on a wireless communication device is also described. The apparatus includes means for obtaining a condition measurement that includes a signal condition measurement. The apparatus also includes means for determining if the condition measurement is above a threshold. The apparatus further includes means for bypassing a second stage active filter if the condition measurement is above the threshold.

DETAILED DESCRIPTION

Figure 1:
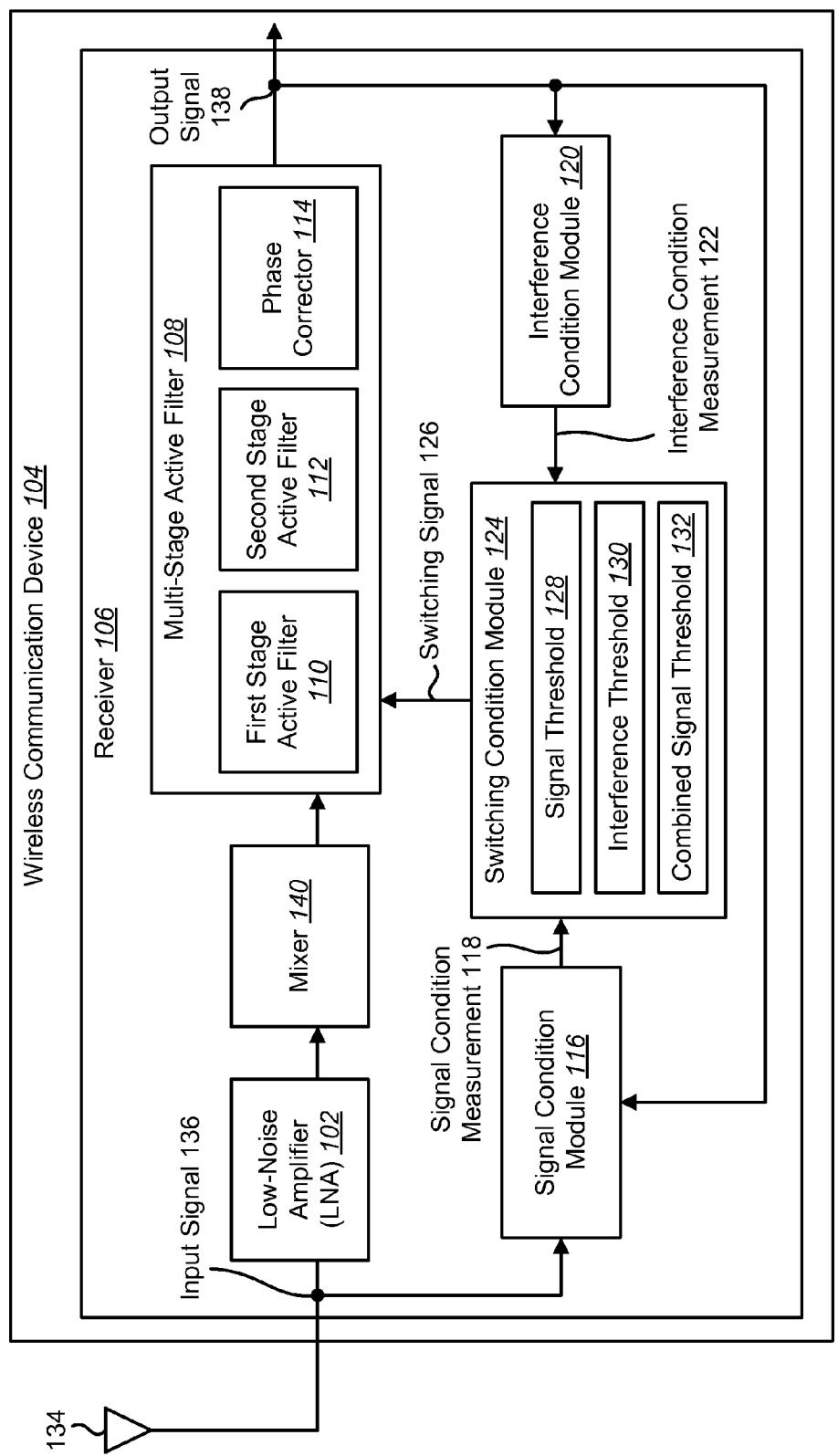
FIG. 1 illustrates an example of a wireless communication device in which the systems and methods disclosed herein may be utilized.

FIG. 1 illustrates an example of a wireless communication device 104 in which the systems and methods disclosed herein may be utilized. The wireless communication device 104 includes a receiver 106 and an antenna 134. The receiver 106 may be configured to reduce the power consumption of the wireless communication device 104. The wireless communication device 104 may be designed to implement one or more standards such as Long Term Evolution (LTE), wideband code division multiple access (W-CDMA) and/or other standards. It should be appreciated that while the presents systems and methods described herein relate to a Long Term Evolution (LTE) wireless communication device 104, corresponding systems and methods may also be practiced in other wireless communication systems, such as Global System for Mobile Communications (GSM) systems, Enhanced Data Rates for GSM Evolution (EDGE) systems, Code Division Multiple Access (CDMA) systems, etc.

As used herein, the term "wireless communication device" refers to an electronic device that may be used for voice and/or data communication over a wireless communication system. Examples of wireless communication devices 104 include cellular phones, personal digital assistants (PDAs), handheld devices, wireless modems, laptop computers, personal computers, machine type communication (MTC) devices, machine-to-machine (M2M) devices and sensor devices (including, for example, so-called "smart-meters," alarms and health monitoring devices). A wireless communication device 104 may alternatively be referred to as an access terminal, a mobile terminal, a mobile station, a remote station, a user terminal, a terminal, a subscriber unit, a subscriber station, a mobile device, a wireless device, user equipment (UE), an MTC device or an M2M device, or some other similar terminology.

While only a single receiver 106 is illustrated herein, it should be appreciated that multiple receivers may be employed in the wireless communication device 104. For example, the wireless communication device 104 may include both a primary receiver (PRx) and a diversity receiver (DRx).

As discussed above, the receiver 106 may be configured to reduce the power consumption of the wireless communication device 104. The receiver 106 may include a multi-stage active filter 108 and a switching condition module 124. The switching condition module 124 may reduce the power consumption of the multi-stage active filter 108 when the wireless communication device 104 is receiving a strong input signal 136 by turning off one or more components within the multi-stage active filter 108. For example, the switching signal 126 may shut off an amplifier within a filter in the multi-stage active filter 108 when conditions warrant it.

The multi-stage active filter 108 may be part of a baseband filter (BBF). The multi-stage active filter 108 may provide high gain for the desired signal and provide high anti-aliasing filtering for an analog-to-digital converter (ADC) (not shown) located in the wireless communication device 104.

When the wireless communication device 104 receives an input signal 136, the input signal 136 may include the desired signal and/or interference. Either the desired signal and/or the interference of the input signal 136 may range from a low (i.e., weak) signal to a high (i.e., strong) signal. Typically, signal conditions and/or interference conditions (i.e., the interference level) do not affect the active filtering process of the multi-stage active filter 108. In other words, every component in the multi-stage active filter 108 is typically always turned on to accommodate poor desired signal and interference conditions, regardless of the real signal conditions and/or the interference conditions. In this manner, unnecessary power is wasted. By turning off one or more components within the multi-stage active filter 108 during strong signal and/or low interference conditions, the power consumption of the wireless communication device 104 may be reduced.

If the input signal 136 has a low signal strength, every component in the multi-stage active filter 108 may be needed to properly amplify the desired signal and filter the unwanted interference input signal 136. However, if the input signal 136 is strong (e.g., the receive power level is high), the receiver 106 may reduce gain as well as the amount of active filtering that occurs. For example, the receiver 106 may reduce power or power down one or more active filter stages within the multi-stage active filter 108 to conserve power on the wireless communication device 104. Similarly, power conservation may also be achieved through measuring interference conditions and reducing one or more active filter stages when interference levels are low.

The receiver 106 may include a low noise amplifier (LNA) 102 and a mixer 140. An input signal 136 may be input in to the low noise amplifier (LNA) 102. The input signal 136 may be obtained from the antenna 134. In some configurations, the input signal 136 may be a differential signal. In other words, the input signal 136 may be separated into two signals. The differential signals may correspond to each other. For example, the differential signals may include similar signals that are out of phase with each other. In one configuration, one differential signal may be positive and the other differential signal may be negative. As another example, one differential signal may be an inverted signal and the other differential signal may be a non-inverted signal. As yet another example, the input signal may include an inphase (I) signal and a quadrature (Q) signal.

The multi-stage active filter 108 on the receiver 106 may provide filtering to the input signal 136, such as gain (e.g., amplification) and rejection (e.g., out-of-band signal and/or noise filtering). Providing gain and rejection generally involves a multi-stage active filter 108 design, such as a two-stage active filter. The multi-stage active filter 108 may include a first stage active filter 110 and a second stage active filter 112. For example, the first stage active filter 110 may provide gain and the second stage active filter 112 may provide out-of-band rejection and some level of amplification or attenuation. The second stage active filter 112 may be bypassed and powered down based on signal conditions and interference levels.

It should be appreciated that while the multi-stage active filter 108 illustrates a first stage active filter 110 and a second stage active filter 112, additional active filters and/or other active components may be employed within the multi-stage active filter 108. The additional active filters and/or other active components may also be bypassed and powered down based on signal conditions and interference levels.

It should also be appreciated that in some configurations, the second stage active filter 112 may be located before the first stage active filter 110 in a signal path. Thus, the input signal 136 may be sent past the bypassed second stage active filter 112 and processed at the first stage active filter 110. Additionally, while the first stage active filter 110 may provide gain and the second stage active filter 112 may reject out-out-band signals and/or noise, the first stage active filter 110 and the second stage active filter 112 are not limited to such functions. For example, the second stage active filter 112 may provide gain and the first stage active filter 110 may reject out-out-band signals. As another example, the first stage active filter 110 and the second stage active filter 112 may both provide gain and/or reject out-out-band signals.

When the input signal 136 has a good signal connection, such as a strong power level of a signal and/or low interference, the rejection/anti-aliasing stage of the multi-stage active filter 108 may be relaxed or waived without affecting performance. For example, the second stage active filter 112 in the multi-stage active filter 108 may be bypassed and powered down to conserve power. For instance, a wireless communication device 104 in Long Term Evolution (LTE) mode may save 7 milliamps (mA) of battery current by bypassing the second stage active filter 112 active filter. In this instance, the power savings may be a combination of the power saved on both the primary receiver and the diversity receiver.

A strong signal and/or low interference levels may be common in wideband applications, such as in Long Term Evolution (LTE) wireless communication devices 104. In other words, power consumption may be conserved in Long Term Evolution (LTE) wideband mode by bypassing one or more active filters.

In the case of additional active filters (not shown) in the multi-stage active filter 108, the additional active filters may be bypassed and powered down to conserve additional power. Improving battery savings may result in additional battery life and additional talk or data time for the wireless communication device 104.

The multi-stage active filter 108 may also include a phase corrector 114. The phase corrector 114 may adjust the phase of one or more bypassed signals in the multi-stage active filter 108. For example, the phase corrector 114 may shift the phase of a bypassed signal 180 degrees. In the case of differential signals, the phase corrector 114 may cross over the two differential signals that have bypassed the second stage active filter 112 to compensate for phase flip. Additional details regarding the phase corrector 114 will be given below in connection with FIG. 6.

The low noise amplifier (LNA) 102 may amplify the input signal 136. The low noise amplifier (LNA) 102 may output an amplified signal to the mixer 140. The mixer 140 may downconvert the amplified signal. The mixer 140 may output a downconverted signal to the multi-stage active filter 108.

The receiver 106 may also include a signal condition module 116, an interference condition module 120 and a switching condition module 124. The signal condition module 116 may obtain a portion of the input signal 136, which is received at the antenna 134. The signal condition module 116 may also obtain a portion of the output signal 138 from the output of the multi-stage active filter 108. In other words, the signal condition module 116 may receive the input signal 136 and/or the output signal 138.

The signal condition module 116 may measure the signal level of received signals (i.e., the input signal 136) at (i.e. from) the antenna 134 as a signal condition measurement 118. The signal condition measurement 118 may be a power level signal (e.g., measured as a power ratio in decibels (dB) relative to one milliwatt (dBm)), a Boolean value, a range of values or another set of values. In some configurations, the signal condition measurement 118 may be a wideband signal condition measurement, for example, as employed in Long Term Evolution (LTE) networks. The signal condition module 116 may provide the signal condition measurement 118 to the switching condition module 124. In some configurations, the signal condition module 116 may be located within or may be part of the switching condition module 124.

The switching condition module 124 may determine if the signal condition measurement 118 is at or above a signal threshold 128. The signal threshold 128 may be a value corresponding to the signal condition measurement 118, such as a decibel value. For example, the signal threshold 128 may be −55 dBm. The signal threshold 128 may include multiple values and may rank the signal condition measurement 118 from high to low, or according to some other range.

The interference condition module 120 may measure levels of interference at the receiver 106 similar to how the signal condition module 116 measures signal strength and signal condition. The interference condition module 120 may receive the input signal 136 and/or the output signal 138. In some configurations, the interference condition module 120 may receive a signal from a component or subcomponent located between the input signal 136 and the output signal 138.

The interference condition module 120 may measure the strength of the interference in either the analog domain or the digital domain. In the analog domain, filters may be employed to select the interference, which may then be processed by analog comparators. In the digital domain, a fast Fourier transform (FFT) may be employed to determine the interference frequency and strength.

The interference condition module 120 may provide an interference condition measurement 122 to the switching condition module 124. The interference condition measurement 122 may reflect the measured interference. The interference condition measurement 122 may be a power level signal (e.g., measured in dBm), a Boolean value, a range of values or another set of values. In some configurations, the interference condition module 120 may be part of the switching condition module 124.

The switching condition module 124 may obtain the signal condition measurement 118. The switching condition module 124 may compare the signal condition measurement 118 to the signal threshold 128. If the signal condition measurement 118 is at or above the signal threshold 128, the switching condition module 124 may adjust a switching signal 126 to the multi-stage active filter 108, causing the multi-stage active filter 108 to bypass and power down second stage active filter 112.

The switching condition module 124 may also obtain the interference condition measurement 122. The switching condition module 124 may compare the interference condition measurement 122 to the interference threshold 130. The interference threshold 130 may be −44 dBm as required by Long Term Evolution (LTE) receiver blocking tests, for example. If the interference condition measurement 122 is at or above the interference threshold 130, the switching condition module 124 may adjust the switching signal 126 to the multi-stage active filter 108, causing the multi-stage active filter 108 to bypass and power down the second stage active filter 112. Thus, either the signal condition measurement 118 or the interference condition measurement 122 may trigger the switching condition module 124 to adjust the switching signal 126 to the multi-stage active filter 108, causing the multi-stage active filter 108 to bypass and power down the second stage active filter 112.

In one configuration, the signal condition measurement 118 may be combined with the interference condition measurement 122 and may be compared to a combined signal threshold 132. If the combined signal condition measurement 118 and interference condition measurement 122 is above the combined signal threshold 132, the switching condition module 124 may adjust the switching signal 126 to the multi-stage active filter 108, causing the multi-stage active filter 108 to bypass and power down the second stage active filter 112. When the second stage active filter 112 (or other additional filters) on the multi-stage active filter 108 is bypassed, power may be conserved on the wireless communication device 104.

The multi-stage active filter 108 may output an output signal 138. Depending on the switching signal 126, the multi-stage active filter 108 may be instructed to bypass and power down the second stage active filter 112 (and/or additional active filters). If the signal power level is strong and the interference level is low, then the multi-stage active filter 108 may be instructed to bypass and power down the second stage active filter 112. Under these conditions, the second stage active filter 112 may be bypassed with negligible signal degradation. In addition, the wireless communication device 104 may have an increase in power savings as the power to the second stage active filter 112 is conserved.

In some configurations, the receiver 106 may be employed in wideband Long Term Evolution (LTE) mode. Long Term Evolution (LTE) is a standard for providing voice, data and signaling services to and from wireless communication devices. A Long Term Evolution (LTE) network employs Orthogonal Frequency Division Multiple Access (OFDMA) and an Evolved Packet System (EPS). An OFDMA network may implement a radio technology such as Evolved Universal Terrestrial Radio Access UTRA (E-UTRA), IEEE 802.11, IEEE 802.16, IEEE 802.20, Flash-OFDMA, etc. Long Term Evolution (LTE) is a release of UMTS that uses E-UTRA.

In some configurations, the receiver 106 may be employed in CDMA mode or a TDMA mode. A CDMA network may implement a radio technology such as Universal Terrestrial Radio Access (UTRA), CDMA2000, etc. UTRA includes W-CDMA and Low Chip Rate (LCR). A TDMA network may implement a radio technology such as Global System for Mobile Communications (GSM). UTRA, E-UTRA and Global System for Mobile Communications (GSM) are part of Universal Mobile Telecommunication System (UMTS). UTRA, E-UTRA, GSM, UMTS and Long Term Evolution (LTE) are described in documents from an organization named "3rd Generation Partnership Project" (3GPP).

Figure 2:
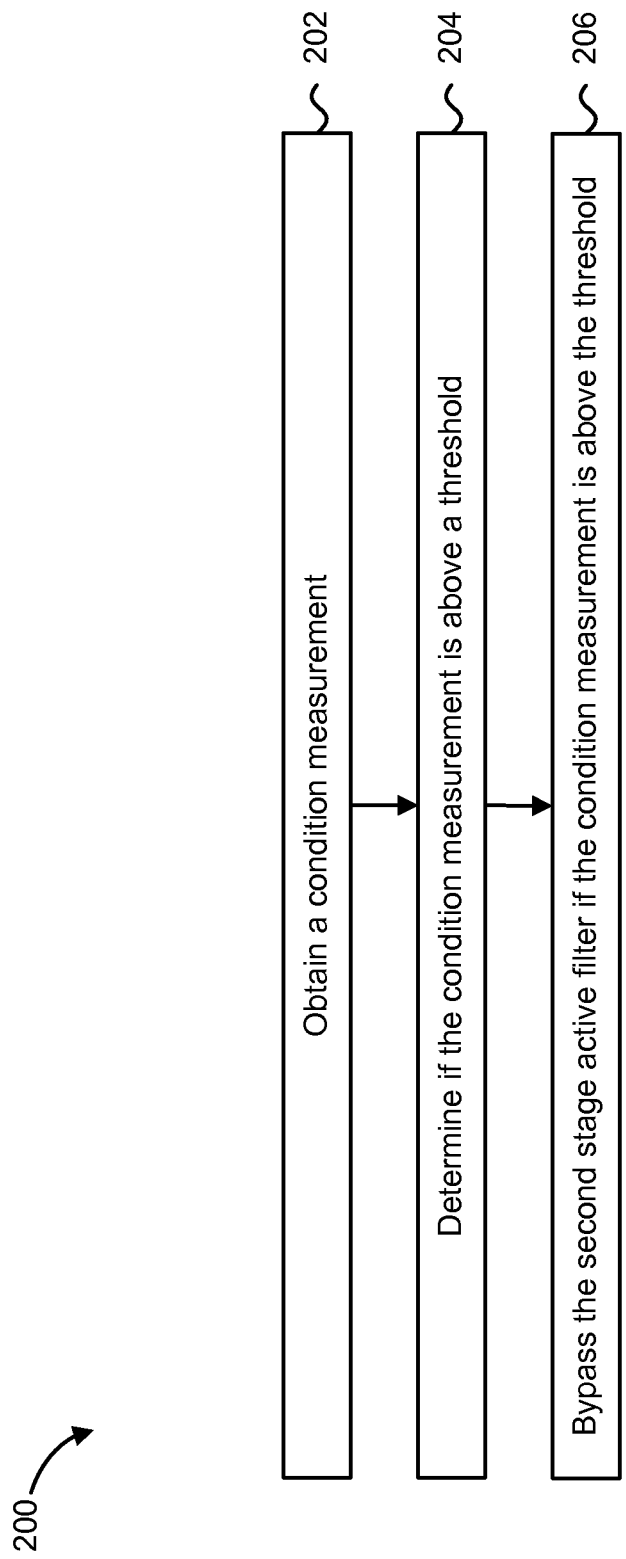
FIG. 2 is a flow diagram of a method for reducing power consumption on a wireless communication device.

FIG. 2 is a flow diagram of a method 200 for reducing power consumption on a wireless communication device 104. The method 200 may be performed by a wireless communication device 104. The wireless communication device 104 may include a multi-stage active filter 108 that includes a first stage active filter 110 and a second stage active filter 112.

The wireless communication device 104 may obtain 202 a condition measurement. The condition measurement may be based on a signal condition measurement 118 and/or an interference condition measurement 122. In one configuration, the condition measurement may be the signal condition measurement 118. In another configuration, the condition measurement may be the interference condition measurement 122. In yet another configuration, the condition measurement may be a combination of the signal condition measurement 118 and the interference condition measurement 122.

The wireless communication device 104 may determine 204 if the condition measurement is above a threshold. For example, if the condition measurement is a signal condition measurement 118, the wireless communication device 104 may determine if the signal condition measurement 118 is above the signal threshold 128. If the condition measurement is an interference condition measurement 122, the wireless communication device 104 may determine if the interference condition measurement 122 is above the interference threshold 130. If the condition measurement is a combined condition measurement, the wireless communication device 104 may determine if the combined condition measurement is above the combined signal threshold 132.

The wireless communication device may bypass 206 the second stage active filter 112 if the condition measurement is above the threshold. For example, if the condition measurement is above a corresponding threshold, as described above, the switching control module 124 may adjust a switching signal 126 to indicate that the second stage active filter 112 should be bypassed. In some configurations, bypassing the second stage active filter 112 may also include disabling power to the second stage active filter 112.

Figure 3:
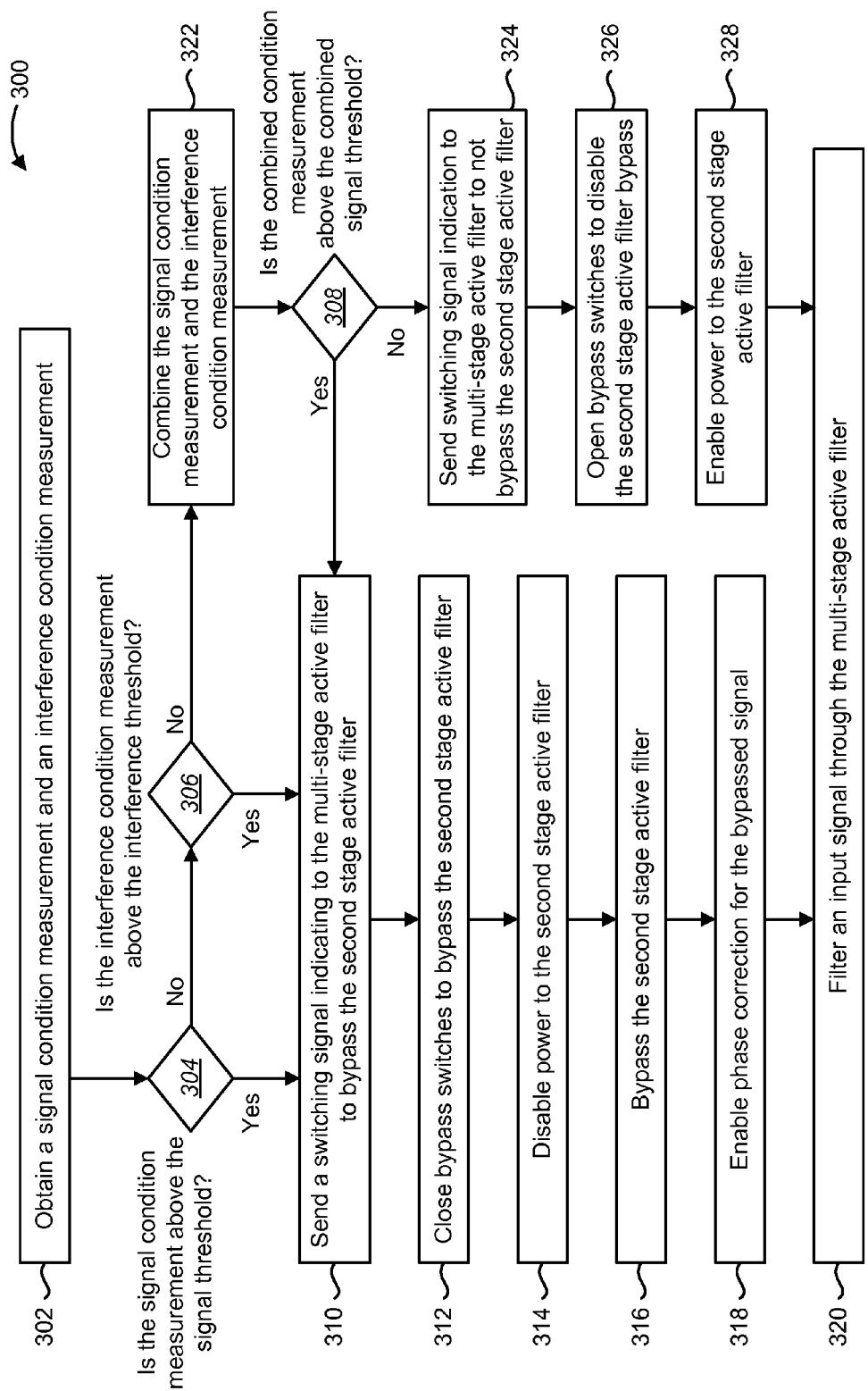
FIG. 3 is a flow diagram of a more detailed method for reducing power consumption on a wireless communication device.

FIG. 3 is a flow diagram of a more detailed method 300 for reducing power consumption on a wireless communication device 104. The method 300 may be performed by a wireless communication device 104. The wireless communication device 104 may include a multi-stage active filter 108 that includes a first stage active filter 110 and a second stage active filter 112.

The wireless communication device 104 may obtain 302 a signal condition measurement 118 and an interference condition measurement 122. Both the signal condition measurement 118 and the interference condition measurement 122 may be measured in the digital baseband by processing the output signal 138. For example, the signal condition module 116, the switching condition module 124 and the interference condition module 120 may each be part of the digital baseband. Alternatively, the signal condition measurement 118 may be measured in the digital baseband and the interference condition measurement 122 may be measured in the analog domain, as described previously.

The wireless communication device 104 may determine 304 if the signal condition measurement 118 is above the signal threshold 128. If it is determined 304 that the signal condition measurement 118 is above the signal threshold 128, the wireless communication device may send 310 a switching signal 126 indicating to the multi-stage active filter 108 to bypass and power down the second stage active filter 112.

Sending 310 a switching signal 126 indicating to the multi-stage active filter 108 to bypass and power down the second stage active filter 112 may trigger the wireless communication device 104 to perform additional actions. For example, the wireless communication device 104 may close 312 bypass switches to the second stage active filter 112. Closing 312 one or more bypass switches may allow the second stage active filter 112 to be bypassed. For example, closing 312 the one or more bypass switches may allow for the second stage active filter 112 to be bypassed. Additional detail regarding bypass switches will be provided below in FIG. 6.

The wireless communication device 104 may disable 314 power to the second stage active filter 112. Because the second stage active filter 112 is bypassed, the second stage active filter 112 is not used for signal processing. Thus, the second stage active filter 112 may be powered down. In some instances, the second stage active filter 112 may reduce power consumption rather than powering down. By disabling 314 power to the second stage active filter 112, the wireless communication device 104 may conserve power, extend battery life and extend talk time.

In some configurations, the multi-stage active filter 108 may need to correct the phase of the output signal 138 when an active filter is bypassed. Thus, if the signal bypasses the second stage active filter 112, the phase of the output signal may need correction. For example, the phase may need to be shifted or flipped 180 degrees. In these configurations, the wireless communication device 104 may enable 318 phase correction for the bypassed signal. Thus, if a signal, such as the input signal 136, bypasses the second stage active filter 112, then a phase correction may be applied to compensate for phase mismatches. The wireless communication device 104 may then filter 320 an input signal 136 through the multi-stage active filter 108.

If the second stage active filter 112 is bypassed 316, then only the first stage active filter 110 may be employed (while the second stage active filter 112 is powered down). In this manner, power may be conserved and battery life may be extended without signal degradation.

If it is determined 304 that the signal condition measurement 118 is not above the signal threshold 128, the wireless communication device 104 may determine 306 if the interference condition measurement 122 is above the interference threshold 130. If it is determined 306 that the interference condition measurement 122 is above the interference threshold 130, the wireless communication device may send 310 a switching signal 126 indicating to the multi-stage active filter 108 to bypass and power down the second stage active filter 112.

If it is determined 306 that the interference condition measurement 122 is not above the interference threshold 130, the wireless communication device 104 may combine 322 the signal condition measurement 118 and the interference condition measurement 122. The wireless communication device 104 may then determine 308 whether the combined signal condition measurement 118 and interference condition measurement 122 is above the combined signal threshold 132.

If it is determined 308 that the combined signal condition measurement 118 and interference condition measurement 122 is not above the combined signal threshold 132, the wireless communication device may send 324 a switching signal 126 indicating to the multi-stage active filter 108 not to bypass the second stage active filter 112. In this instance, the wireless communication device 104 may open 326 bypass switches to disable bypassing of the second stage active filter 112. The wireless communication device 104 may also enable 328 power to the second stage active filter 112. The wireless communication device 104 may then filter 320 an input signal 136 through the multi-stage active filter 108.

In this instance, the signal condition measurement 118 is not above the signal threshold 128, the interference condition measurement 122 is not above the interference threshold 130 and the combined signal condition measurement 118 and interference condition measurement 122 is not above the combined signal threshold 132. Thus, the wireless communication device 104 does not bypass the second stage active filter 112 in the multi-stage active filter 108 and the multi-stage active filter 108 employs both the first stage active filter 110 and the second stage active filter 112.

Figure 4:
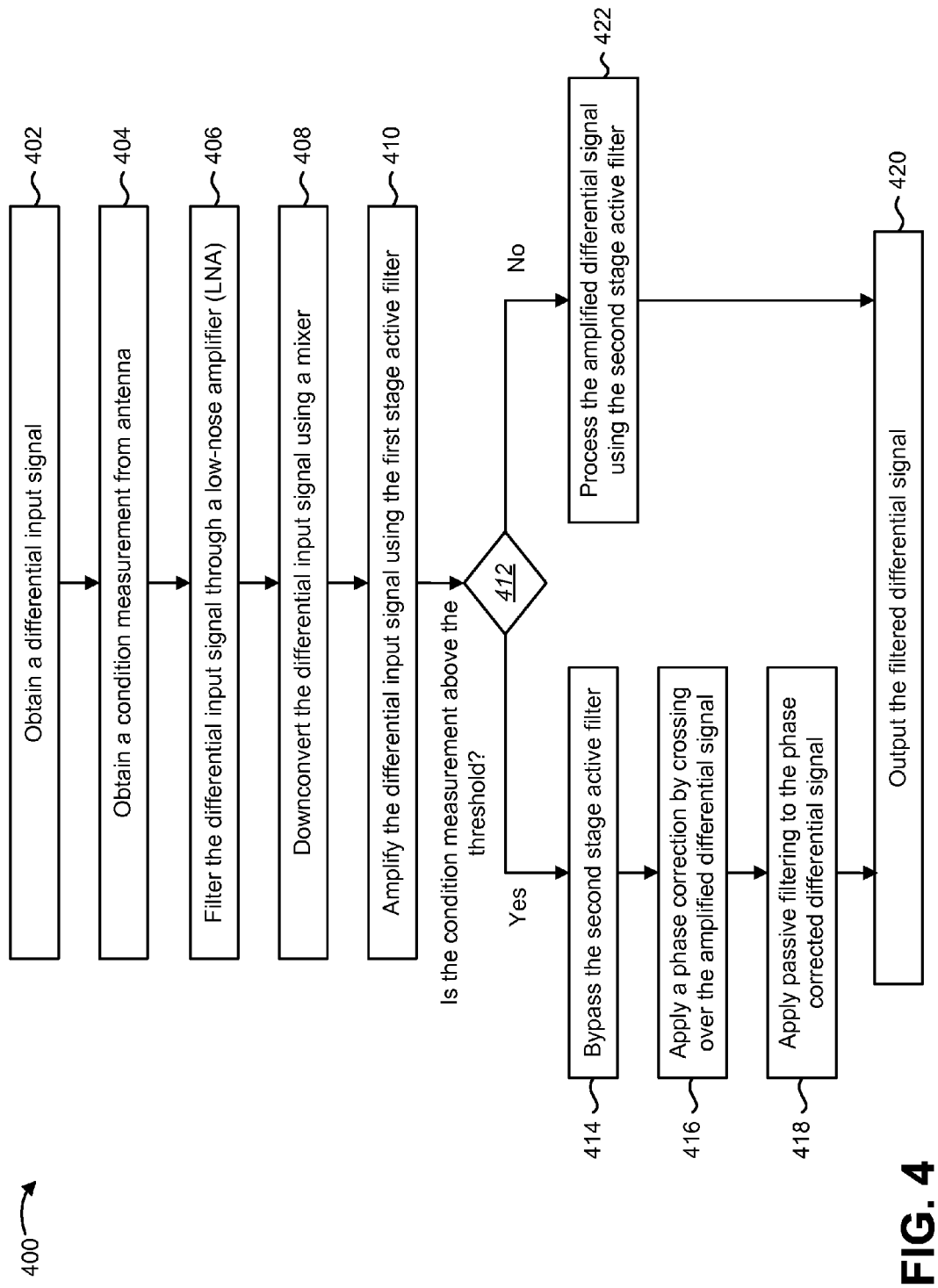
FIG. 4 is a flow diagram of another method for reducing power consumption on a wireless communication device.

FIG. 4 is a flow diagram of another method 400 for reducing power consumption on a wireless communication device 104. The method 400 may be performed by a wireless communication device 104. For example, the wireless communication device 104 may include a multi-stage active filter 108 that includes a first stage active filter 110 and a second stage active filter 112.

The wireless communication device 104 may obtain 402 a differential input signal. For example, the differential input signal may be obtained from the input signal 136. For instance, the input signal 136 may be separated into in-phase (I) and quadrature (Q) components to form the differential signal.

The wireless communication device 104 may obtain 404 a condition measurement from the antenna 134. For example, the condition measurement may be obtained based on a signal condition measurement 118 and/or an interference condition measurement 122. The wireless communication device 104 may filter 406 the differential input signal through a low noise amplifier (LNA) 102. The wireless communication device 104 may downconvert 408 the differential input signal using a mixer 140.

The wireless communication device 104 may amplify 410 the differential input signal using the first stage active filter 110. For example, the differential input signal may be provided to the multi-stage active filter 108. The multi-stage active filter 108 may include a first stage active filter 110, a second stage active filter 112, additional active filters (not shown) and/or other active components (not shown). Amplifying 410 the differential input signal may result in an amplified differential signal.

The wireless communication device 104 may determine 412 if the condition measurement is above a threshold. This may be accomplished as described in FIG. 3 above. If it is determined 412 that the condition measurement is above the threshold, the wireless communication device 104 may bypass 414 the second stage active filter 112. As an example, the threshold may be the signal threshold 128, the interference threshold 130 or the combined signal threshold 132.

Figure 6:
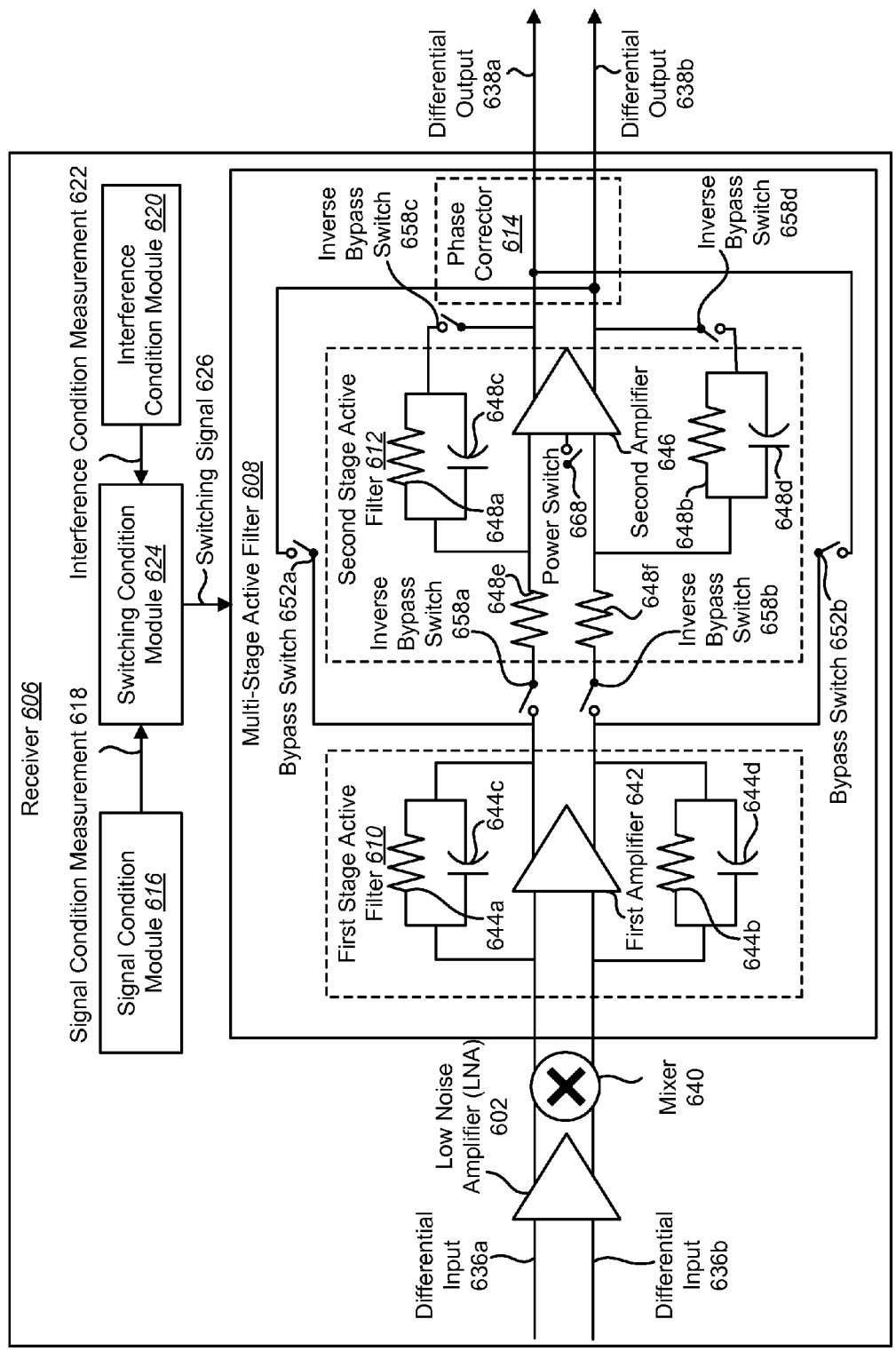
FIG. 6 is a block diagram illustrating one configuration of a receiver on a wireless communication device.

The wireless communication device 104 may apply 416 a phase correction by crossing over the amplified differential signal. For example, if a set of differential signals includes an I portion and a Q portion, the two portions may be crossed to correct for the 180 degrees phase flip that resulted when the second stage active filter 112 was bypassed. An example of crossing to correct the 180 degrees phase flip and/or phase mismatch is illustrated in FIG. 6 below. Applying 416 the phase correction in the amplified differential signal may result in a phase corrected differential signal.

The wireless communication device 104 may apply 418 passive filtering to the phase corrected differential signal. Passive filtering may assist the multi-stage active filter 108 by reducing/rejecting out-of-band signals without requiring power to operate the passive elements. Passive elements may include resistors, capacitors, etc. Applying 418 passive filtering to the phase corrected differential signal may result in a filtered differential signal.

The wireless communication device 104 may output 420 the filtered differential signal. The filtered differential signal may be one example of an output signal 138. The filtered differential signal may be outputted from the receiver 106 to other circuitry within the wireless communication device 104 (such as a modem or an analog-to-digital converter (ADC)). In some configurations, the filtered differential signal may be output to a separate device.

If it is determined 412 that the condition measurement is not above, or does not meet, the threshold, the wireless communication device 104 may process 422 the amplified differential signal using the second stage active filter 112. In some configurations, the second stage active filter 112 may amplify the amplified differential signal. In some configurations, the second stage active filter 112 may filter the amplified differential signal. In this case, processing 422 the amplified differential signal using the second stage active filter 112 may result in filtered differential signal. The wireless communication device 104 may then output 420 the filtered differential signal.

Figure 5:
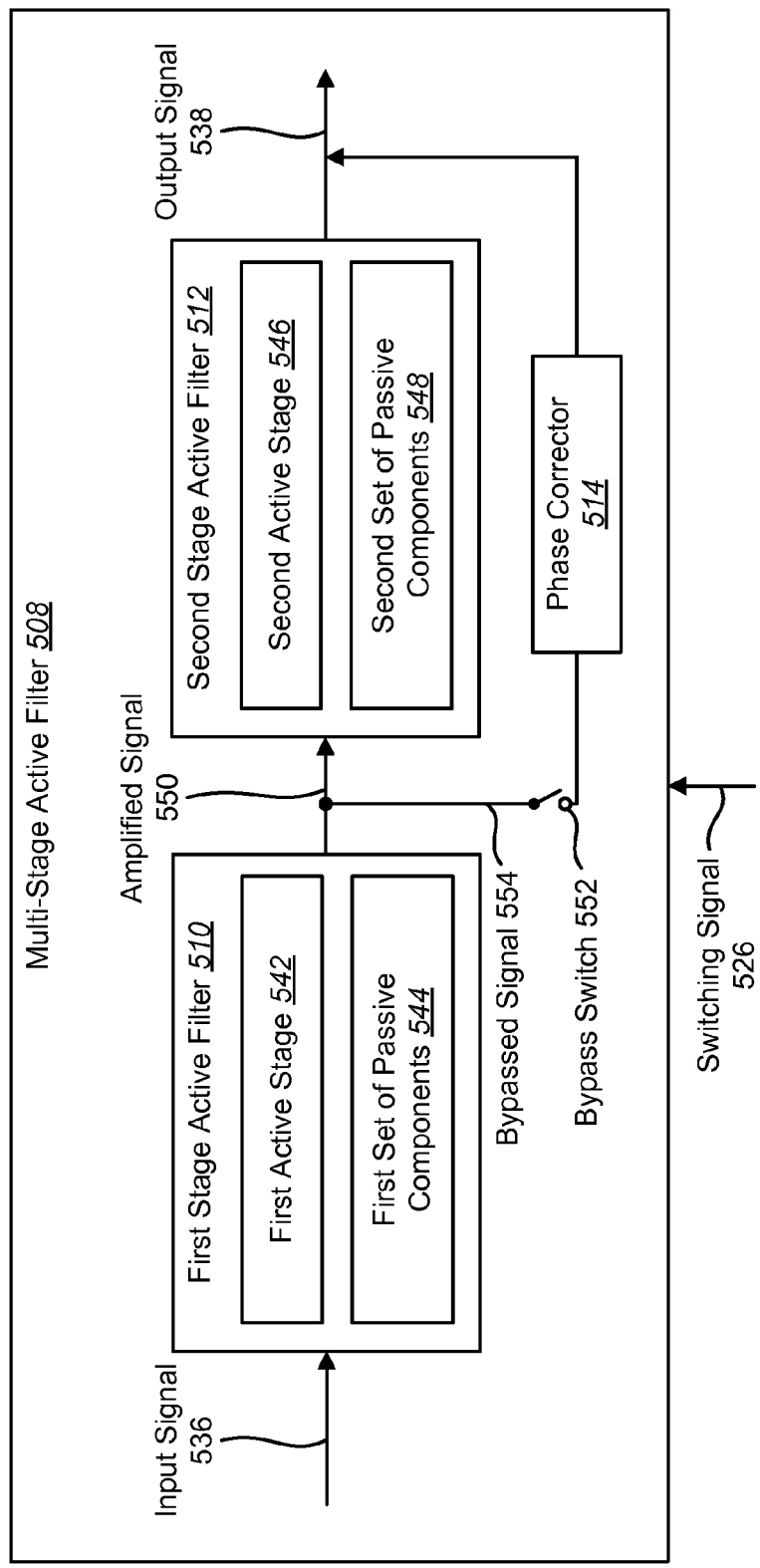
FIG. 5 is a block diagram illustrating a multi-stage active filter on a wireless communication device.

FIG. 5 is a block diagram illustrating a multi-stage active filter 508 on a wireless communication device 104. The multi-stage active filter 508 may be one configuration of the multi-stage active filter 108 described above in connection with FIG. 1. The multi-stage active filter 508 may be part of the receiver 106 and/or the wireless communication device 104.

The multi-stage active filter 508 may include a first stage active filter 510 and a second stage active filter 512. In some configurations, additional active filters may be included. The first stage active filter 510 may include a first active stage 542 and a first set of passive components 544. The first active stage 542 may employ one or more active components, such as amplifiers. In one configuration, the first active stage 542 may include an operational transconductance amplifier (OTA). An operational transconductance amplifier (OTA) may receive one or more voltage inputs and may output differential currents. In other words, an OTA may be a voltage controlled current source (VCCS). The first set of passive components 544 may include resistors, capacitors, inductors and/or transformers.

The second stage active filter 512 may include a second active stage 546 and a second set of passive components 548. The second active stage 546 and the second set of passive components 548 may be similar to the first active stage 542 and the first set of passive components 544. For example, the second set of passive components 548 may include one or more resistors, capacitors, inductors and/or transformers.

The multi-stage active filter 508 may also include a bypass switch 552 and a phase corrector 514. The phase corrector 514 may correct phase mismatches that occur when the second stage active filter 512 is bypassed. The bypass switch 552 may control whether the second stage active filter 512 is to be bypassed. While only one bypass switch 552 is illustrated, multiple bypass switches 552 may be employed. For example, in the case of differential input signals, multiple parallel bypass switches 552 may be employed for each input signal path. Closing the one or more bypass switches 552 may allow for a bypass circuit path that allows a bypassed signal 554 to bypass the second stage active filter 512.

The state of the bypass switch 552 (e.g., open or closed) may be based on the switching signal 526. For example, if the switching signal 526 indicates that the second stage active filter 512 is to be bypassed, the bypass switch 552 may close and complete the circuit to bypass the second stage active filter 512.

The switching signal 526 may also indicate whether to disable power to the second stage active filter 512. For example, the switching signal 526 may indicate that power to the second stage active filter 512 is to be disabled or enabled.

The multi-stage active filter 508 may receive an input signal 536. For example, the input signal 536 may be from an antenna 134 or received from another part of the receiver 106 and/or wireless communication device 104. The first stage active filter 510 may process the input signal 536. For example, the input signal 536 may pass through the first active stage 542 and the first set of passive components 544. The first stage active filter 510 may provide gain to the input signal 536 and generate an amplified signal 550.

The first stage active filter 510 may output the amplified signal 550. The amplified signal 550 may either pass through the second stage active filter 512 or bypass the second stage active filter 512, depending on the signal condition measurement 118 and/or the interference condition measurement 122.

As described above, the switching signal 526 may indicate to the multi-stage active filter 508 whether to bypass and disable power to the second stage active filter 512. The switching signal 526 may be based on the signal condition measurement 118 and/or the interference condition measurement 122 and whether the signal threshold 128, the interference threshold 130 or the combined signal threshold 132 is met and/or exceeded.

If the switching signal 526 indicates to the multi-stage active filter 508 to bypass and power down the second stage active filter 512, the bypass switch 552 may close (e.g., complete the bypass circuit), the amplified signal 550 may bypass the second stage active filter 512 and power to the second stage active filter 512 may be disabled. In this instance, the amplified signal 550 may become a bypassed signal 554. The bypassed signal 554 may pass through the phase corrector 514 and be output as an output signal 538.

If the switching signal 526 indicates to the multi-stage active filter 508 to not bypass the second stage active filter 512, the bypass switch 552 may open (e.g., disable the bypass circuit), power may be enabled at the second stage active filter 512 and the amplified signal 550 may pass through the second stage active filter 512.

The second stage active filter 512 may process the amplified signal 550. For example, the second stage active filter 512 may filter the amplified signal 550. The second stage active filter 512 may output an output signal 538.

FIG. 6 is a block diagram illustrating one configuration of a receiver 606 on a wireless communication device 104. The receiver 606 may be one configuration of the receiver 106 described above in connection with FIG. 1. For example, the receiver 606 may be part of the wireless communication device 104.

The receiver 606 may include a low noise amplifier (LNA) 602, a mixer 640, a signal condition module 616 that generates a signal condition measurement 618, an interference condition module 620 that generates an interference condition measurement 622, a switching condition module 624 and a switching signal 626. The receiver 606 may also include a multi-stage active filter 608. The multi-stage active filter 608 may include a first stage active filter 610 and a second stage active filter 612. In some configurations, additional active filters may be included.

The first stage active filter 610 may include a first amplifier 642 (e.g., a first active stage 542) and a first set of passive components 644a-d. For example, the first amplifier 642 may be an operational transconductance amplifier (OTA). The first set of passive components 644a-d may include resistors 644a-b and capacitors 644c-d.

The second stage active filter 612 may include a second amplifier 646 (e.g., a second active stage 546) and a second set of passive components 648a-d. The second amplifier 646 may be an operational transconductance amplifier (OTA) and the second set of passive components 648a-d may include resistors 648a-b and capacitors 648c-d.

The receiver 606 may include bypass switches 652a-b and corresponding inverse bypass switches 658a-d. The bypass switches 652a-b and corresponding inverse bypass switches 658a-d may control whether the second stage active filter 612 is bypassed. The state of the bypass switches 652a-b (e.g., open or closed) and corresponding inverse bypass switches 658a-d (e.g., closed or open, respectively) may be based on the switching signal 626, as described above. The inverse bypass switches 658a-d may be opened when the bypass switches 652a-b are closed. Likewise, the inverse bypass switches 658a-d may be closed when the bypass switches 652a-b are open. One bypass switch 652, along with corresponding inverse bypass switches 658, may be employed for each signal path of differential input signals 636a-b. For example, bypass switch 652a and inverse bypass switches 658a, 658c, may be used for the signal path corresponding differential input signals 636a. The multiple bypass switches 652a-b may be in parallel with each other.

Changing the state of the bypass switches 652 from open to closed or from closed to open may take micro seconds (μsec). In this manner, the multi-stage active filter 608 may bypass and power down the second stage active filter 612 in a matter of micro seconds (μsec). This is an improvement over other known approaches, such as linearity state machines that control bias current with jammer detectors and hardware interrupts, which take milliseconds (msec) to change states.

The receiver 606 may include a phase corrector 614. The phase corrector 614 may correct phase mismatches caused when the second stage active filter 612 is bypassed. The phase corrector 614 may cross over the two differential inputs 636 that have bypassed the second stage active filter 612 to compensate for phase flip and/or phase mismatch. For example, the differential input signal 636a may cross over at the phase corrector 614 and may become the differential output signal 638b. Similarly, the differential input signal 636b may cross over at the phase corrector 614 and may become the differential output signal 638a. Is should be appreciated that the differential input signals 636a-b and differential output signals 638a-b may correspond to plus/minus or inverted/non-inverted differential signals.

The receiver 606 may include a power switch 668. The power switch 668 may be a second amplifier 646 power switch 668. The power switch 668 may disable power to the second amplifier 646 based on the switching signal 626. For example, the switching signal 626 may indicate to enable or disable power to the second amplifier 646. Disabling power to the second amplifier 646 may result in power savings to the receiver 606 and the wireless communication device 104.

The differential input signals 636a-b may be filtered at the first stage active filter 610. For example, the differential input signals 636a-b may pass through the first amplifier 642 and the first set of passive components 644a-d. The differential input signals 636a-b may or may not bypass the second amplifier 646 and the second set of passive components 648a-d, depending on the switching signal 626. If the second stage active filter 612 is bypassed, the differential input signals 636a-b may cross over in the phase corrector 614 to correct phase flip. The differential input signals 636a-b may be output from the receiver 606 as differential output signals 638a-b.

Figure 7:
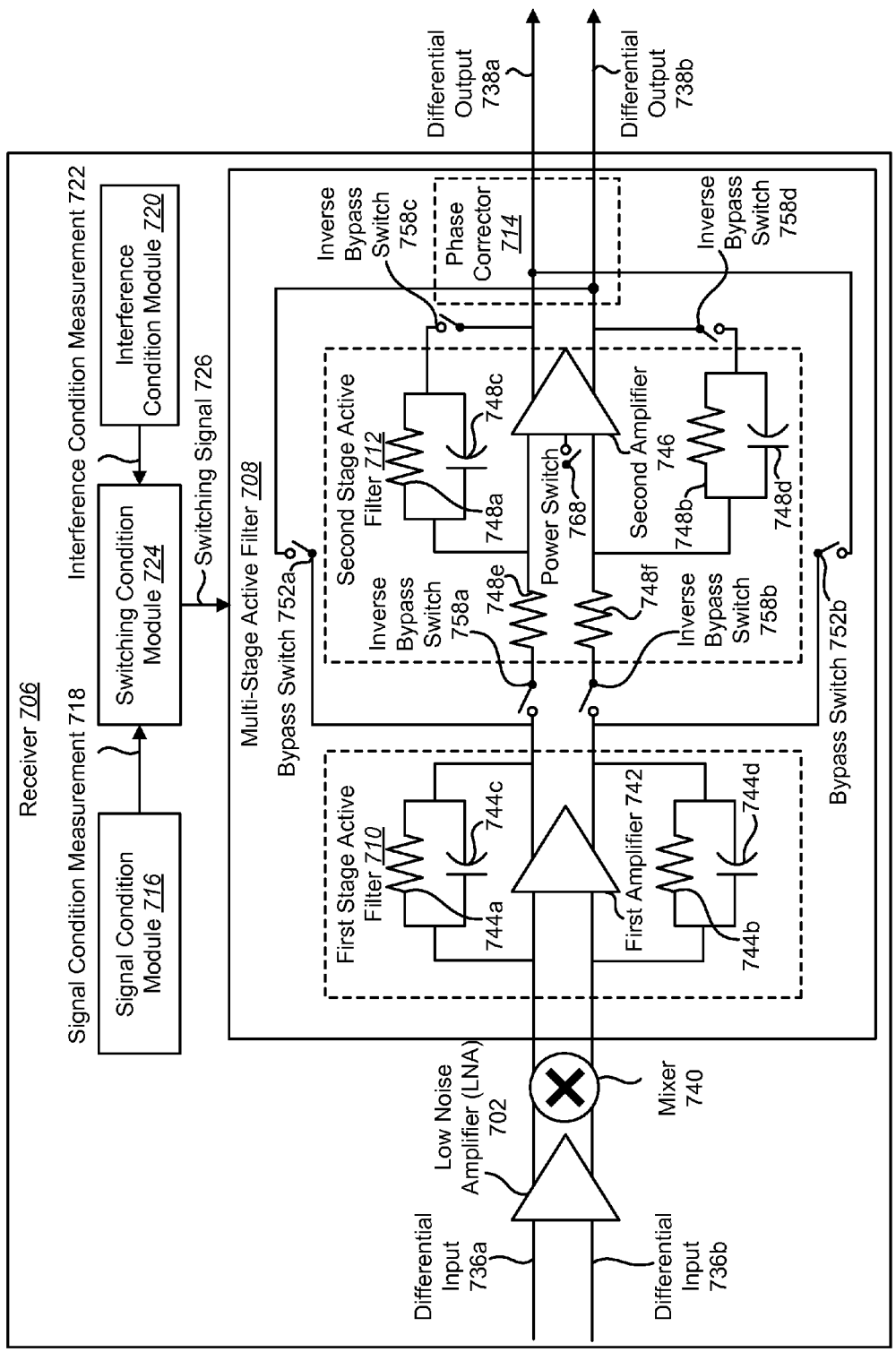
FIG. 7 is a block diagram illustrating another configuration of a receiver on a wireless communication device.

FIG. 7 is a block diagram illustrating another configuration of a receiver 706 on a wireless communication device 104. The receiver 706 may be one configuration of the receiver 106 described above in connection with FIG. 1. For example, the receiver 706 may be part of the wireless communication device 104.

The receiver 706 may include a low noise amplifier (LNA) 702, a mixer 740, a signal condition module 716 that generates a signal condition measurement 718, an interference condition module 720 that generates an interference condition measurement 722, a switching condition module 724 and a switching signal 726. The receiver 706 may also include a multi-stage active filter 708. The multi-stage active filter 708 may include a first stage active filter 710 and a second stage active filter 712.

The first stage active filter 710 may include a first amplifier 742 (e.g., a first active stage 542) and a first set of passive components 744a-d. For example, the first amplifier 742 may be an operational transconductance amplifier (OTA). The first set of passive components 744a-d may include resistors 744a-b and capacitors 744c-d.

The second stage active filter 712 may include a second amplifier 746 (e.g., a second active stage 546) and a second set of passive components 748a-f. The second amplifier 746 may be an operational transconductance amplifier (OTA) and the second set of passive components 748a-e may include resistors 748a-b, 748e-f, and capacitors 748c-d.

The receiver 706 may include bypass switches 752a-b and corresponding inverse bypass switches 758a-d. The bypass switches 752a-b and corresponding inverse bypass switches 758a-d may control whether the second stage active filter 712 is bypassed. The state of the bypass switches 752a-b (e.g., open or closed) may be based on the switching signal 726, as described above. The inverse bypass switches 758a-d may be opened when the bypass switches 752a-b are closed. Likewise, the inverse bypass switches 758a-d may be closed when the bypass switches 752a-b are open. In this manner, the second stage active filter may be completely bypassed when the bypass switches 752a-b are closed, thus conserving battery by not sending power to bypassed components.

Bypassing the second stage active filter 712 does not require changes in linearity state, hardware interrupts or the use of a jammer detector. Additionally, linearity in the multi-stage active filter 708 remains constant regardless of whether the second stage active filter 712 is bypassed or not.

The receiver 706 may include a phase corrector 714. The phase corrector 714 may correct phase mismatches caused when the second stage active filter 712 is bypassed. The phase corrector 714 may cross over the two differential inputs 736a-b that have bypassed the second stage active filter 712 to compensate for phase flip and/or phase mismatch.

The receiver 706 may include a power switch 768. The power switch 768 may be a second amplifier 746 power switch 768. The power switch 768 may disable power to the second amplifier 746 based on the switching signal 726. For example, the switching signal 726 may indicate to enable or disable power to the second amplifier 746. Disabling power to the second amplifier 746 may result in power savings to the receiver 706 and the wireless communication device 104.

The differential input signals 736a-b may be filtered at the first stage active filter 710. For example, the differential input signals 736a-b may pass through the first amplifier 742 and the first set of passive components 744a-d. The differential input signals 736a-b may or may not bypass the second amplifier 746 and the second set of passive components 748a-e, depending on the switching signal 726. If the second stage active filter 712 is bypassed, the differential input signals 736a-b may cross over in the phase corrector 714 to correct phase flip. The differential input signals 736a-b may be output from the receiver 706 as differential output signals 738a-b.

Figure 8:
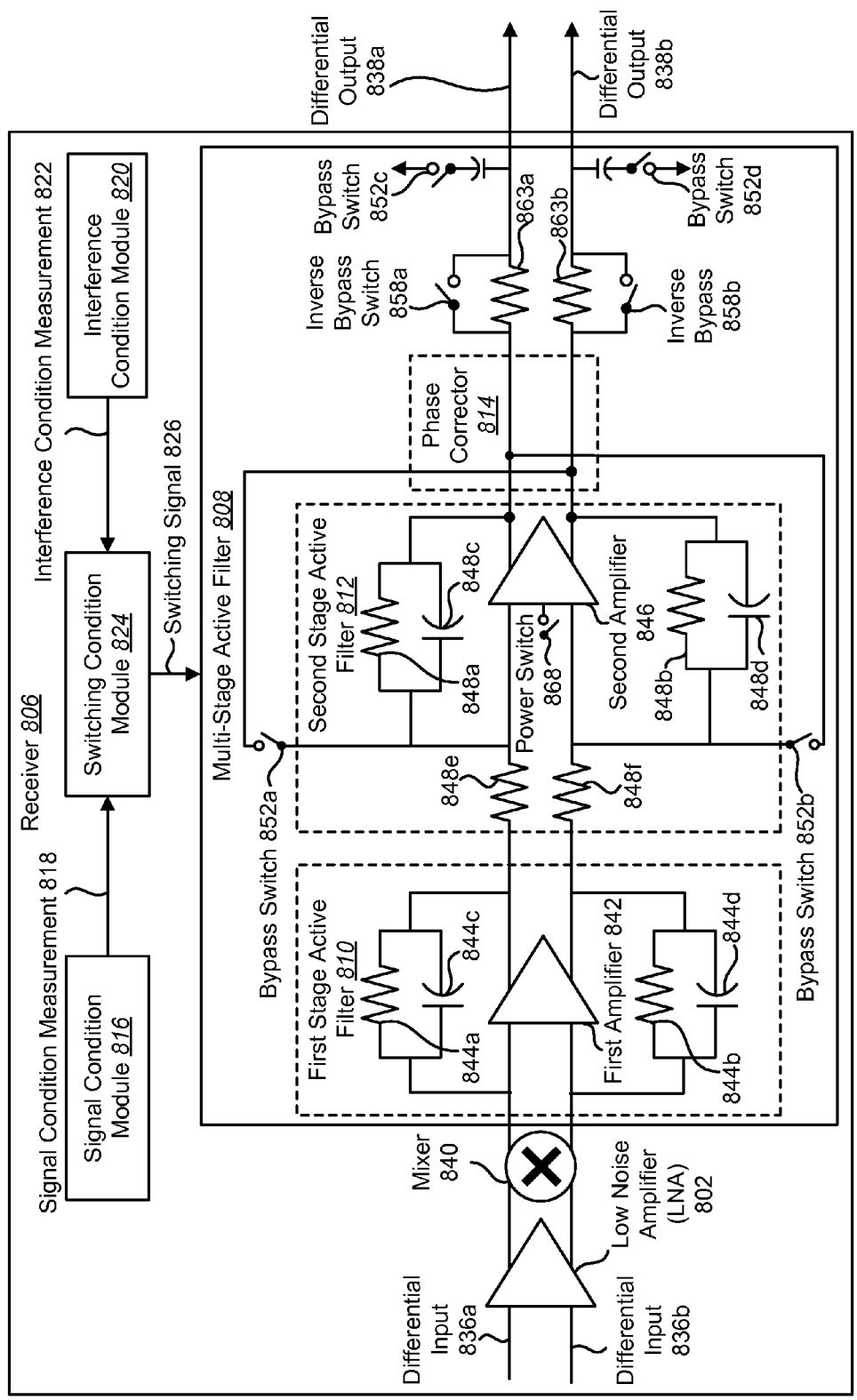
FIG. 8 is a block diagram illustrating yet another receiver on a wireless communication device.

FIG. 8 is a block diagram illustrating yet another receiver 806 on a wireless communication device 104. The receiver 806 may be one configuration of the receiver 106 described above in connection with FIG. 1. For example, the receiver 806 may be part of the wireless communication device 104.

The receiver 806 may include a low noise amplifier (LNA) 802, a mixer 840, a signal condition module 816 that generates a signal condition measurement 818, an interference condition module 820 that generates an interference condition measurement 822, a switching condition module 824 and a switching signal 826. The receiver 806 may also include a multi-stage active filter 808 including a first stage active filter 810 and a second stage active filter 812, bypass switches 852a-b and a power switch 868 (e.g., second amplifier power switch). In some configurations, additional active filters may be included.

The first stage active filter 810 may include a first amplifier 842 (e.g., a first active stage 542) and a first set of passive components 844a-d. The second stage active filter 812 may include a second amplifier 846 (e.g., a second active stage 546) and a second set of passive components 848a-f. The first stage active filter 810, the second stage active filter 812, bypass switches 852 and power switch 868 may be similar to corresponding elements 610, 612 and 652, 668 described in connection with FIG. 6.

In some configurations, the receiver 806 may include additional bypass switches 852c-d, inverse bypass switches 858a-b and additional passive components 863a-b. For example, the additional passive components 863a-b may be resistors used to reject out-of-band signals and noise. The additional passive components 863a-b may be employed without required additional power at the receiver 806.

When the switching signal 826 indicates to the multi-stage active filter 808 to bypass the second stage active filter 812, the bypasses switches 852 may close to bypass the second stage active filter 812. At the same time, the inverse bypass switches 858 may open. Similarly, when the switching signal 826 indicates to the multi-stage active filter 808 to not bypass the second stage active filter 812, the bypasses switches 852 may open and the inverse bypass switches 858 may close. In this manner, the bypass switches 852 and the inverse bypass switches 858 remain in opposite states.

When the inverse bypass switches 858 are open (e.g., the second stage active filter 812 is bypassed), the differential signals may pass through the additional passive components 863*a-b*. When the inverse bypass switches 858 are closed (e.g., the second stage active filter 812 is not bypassed), the differential signals may bypass the additional passive components 863*a-b*. In this manner, additional passive filtering may be performed only when the second stage active filter 812 is bypassed.

In FIG. 8, differential input signals 836*a-b* may pass through the low noise amplifier (LNA) 802 and the mixer 840. The differential input signals 836*a-b* may be filtered at the first stage active filter 810. For example, the differential input signals 836*a-b* may pass through the first amplifier 842 and the first set of passive components 844*a-d*. The differential input signals 836*a-b* may or may not bypass the second amplifier 846 and the second set of passive components 848*a-f*, depending on the switching signal 826.

If the second stage active filter 812 is bypassed, the differential signals may cross over in the phase corrector 814 to correct phase flip. The differential signals may be filtered by the additional passive components 863 before being output from the receiver 806 as differential output signals 838*a-b*. In this manner, power may be conserved. For example, in Long Term Evolution (LTE) mode, 8 milliamps (mA) of battery current may be conserved at a wireless communication device 104 employing a primary receiver (PRx) and a secondary receiver (SRx).

If the second stage active filter 812 is not bypassed, the differential input signals 836*a-b* may be amplified/filtered by the second amplifier 846 and second set of passive components 848. The differential signals may then bypass the additional passive components 863 via the inverse bypass switches 858*a-b* and may be output from the receiver 806 as differential output signals 838*a-b*.

Figure 9:
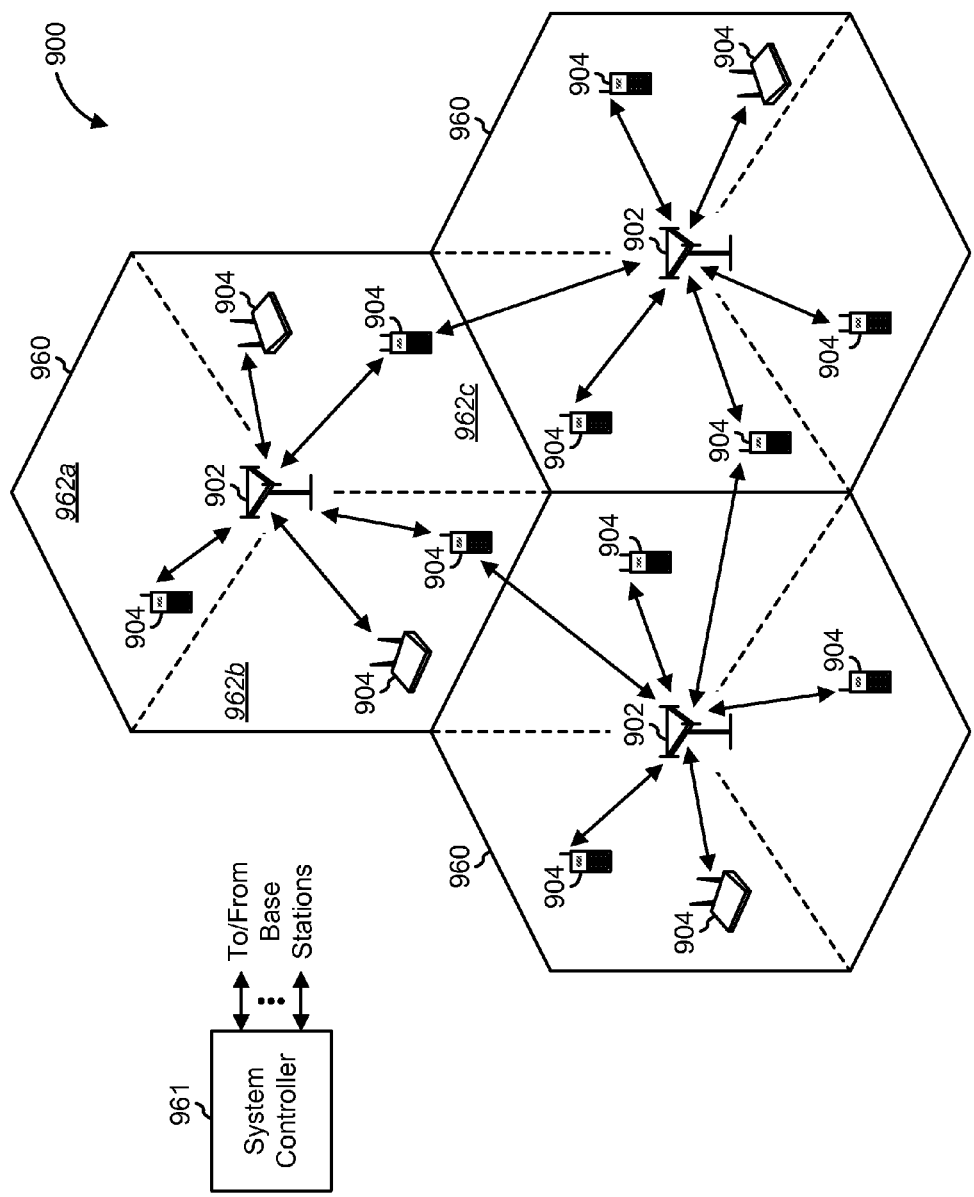
FIG. 9 illustrates an example of a wireless communication system in which the systems and methods disclosed herein may be utilized.

FIG. 9 illustrates an example of a wireless communication system 900 in which the systems and methods disclosed herein may be utilized. The wireless communication system 900 includes multiple base stations 902 and multiple wireless communication devices 904. Each base station 902 provides communication coverage for a particular geographic area 960. The term "cell" can refer to a base station 902 and/or its coverage area 960, depending on the context in which the term is used.

As used herein, the term "base station" refers to a wireless communication station that is used to communicate with wireless communication devices 904. A base station 902 may alternatively be referred to as an access point (including nano-, pico- and femto-cells), a Node B, an evolved Node B, a Home Node B or some other similar terminology.

To improve system capacity, a base station coverage area 960 may be partitioned into plural smaller areas, e.g., three smaller areas 962*a*, 962*b*, and 962*c*. Each smaller area 962*a*, 962*b*, 962*c*, may be served by a respective base transceiver station (BTS). The term "sector" can refer to a BTS and/or its coverage area 962, depending on the context in which the term is used. For a sectorized cell, the BTSs for all sectors of that cell are typically co-located within the base station 902 for the cell.

Wireless communication devices 904 are typically dispersed throughout the wireless communication system 900. A wireless communication device 904 may communicate with one or more base stations 902 on the downlink and/or uplink at any given moment. The downlink (or forward link) refers to the communication link from a base station 902 to a wireless communication device 904, and the uplink (or reverse link) refers to the communication link from a wireless communication device 904 to a base station 902. Uplink and downlink may refer to the communication link or to the carriers used for the communication link.

For a centralized architecture, a system controller 961 may couple to the base stations 902 and provide coordination and control for the base stations 902. The system controller 961 may be a single network entity or a collection of network entities. For a distributed architecture, base stations 902 may communicate with one another as needed.

Figure 10:
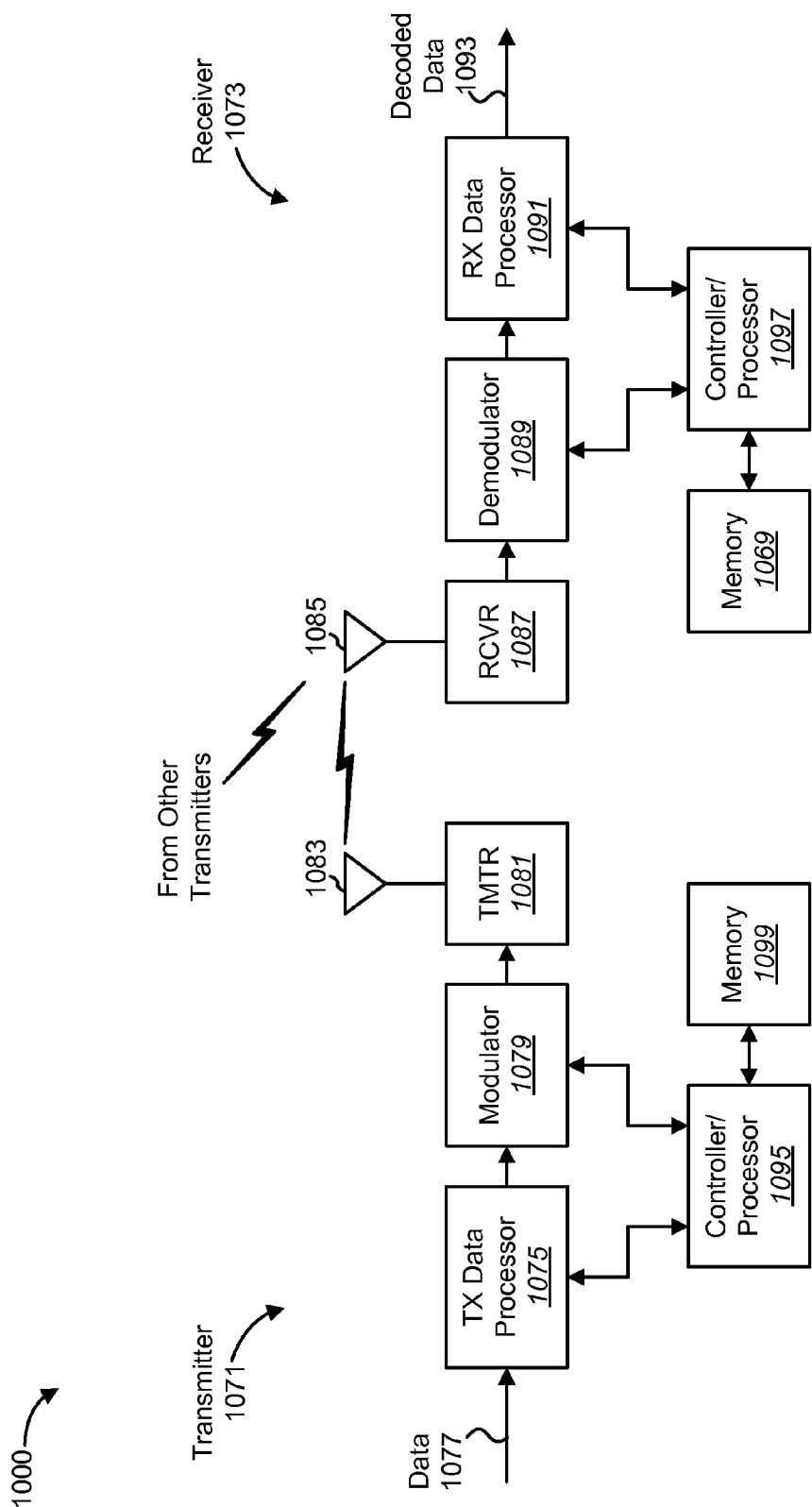
FIG. 10 illustrates a block diagram of a transmitter and a receiver in a wireless communication system.

FIG. 10 illustrates a block diagram of a transmitter 1071 and a receiver 1073 in a wireless communication system 1000. For the downlink, the transmitter 1071 may be part of a base station 102 and the receiver 1073 may be part of a wireless communication device 104. For the uplink, the transmitter 1071 may be part of a wireless communication device 104 and the receiver 1073 may be part of a base station 102.

At the transmitter 1071, a transmit (TX) data processor 1075 receives and processes (e.g., formats, encodes, and interleaves) data 1077 and provides coded data. A modulator 1079 performs modulation on the coded data and provides a modulated signal. The modulator 1079 may perform Gaussian minimum shift keying (GMSK) for GSM, 8-ary phase shift keying (8-PSK) for Enhanced Data rates for Global Evolution (EDGE), etc. GMSK is a continuous phase modulation protocol, whereas 8-PSK is a digital modulation protocol. A transmitter unit (TMTR) 1081 conditions (e.g., filters, amplifies, and upconverts) the modulated signal and generates an RF-modulated signal, which is transmitted via an antenna 1083.

At the receiver 1073, an antenna 1085 receives RF-modulated signals from the transmitter 1071 and other transmitters. The antenna 1085 provides a received radio frequency (RF) signal to a receiver unit (RCVR) 1087. The receiver unit 1087 conditions (e.g., filters, amplifies, and downconverts) the received RF signal, digitizes the conditioned signal, and provides samples. A demodulator 1089 processes the samples as described below and provides demodulated data. A receive (RX) data processor 1091 processes (e.g., deinterleaves and decodes) the demodulated data and provides decoded data 1093. In general, the processing by demodulator 1089 and RX data processor 1091 is complementary to the processing by the modulator 1079 and the TX data processor 1075, respectively, at the transmitter 1071.

Controllers/processors 1095 and 1097 direct operation at the transmitter 1071 and receiver 1073, respectively. Memories 1099 and 1069 store program codes in the form of computer software and data used by the transmitter 1071 and receiver 1073, respectively.

Figure 11:
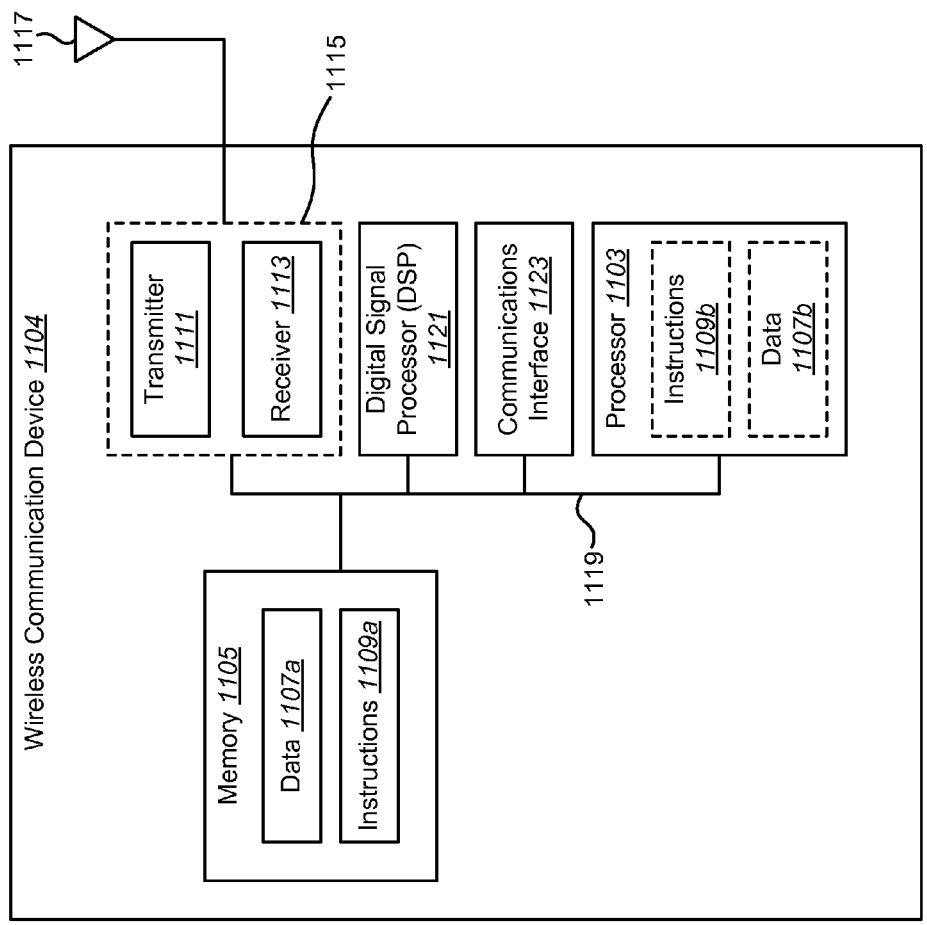
FIG. 11 illustrates certain components that may be included within a wireless communication device.

FIG. 11 illustrates certain components that may be included within a wireless communication device 1104. The wireless communication device 1104 may be an access terminal, a mobile station, a user equipment (UE), etc. The wireless communication device 1104 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the wireless communication device 1104 of FIG. 11, in an alternative configuration, a combination of processors (e.g., an ARM and DSP) could be used.

The wireless communication device 1104 also includes memory 1105. The memory 1105 may be any electronic component capable of storing electronic information. The memory 1105 may be random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1107*a* and instructions 1109*a* may be stored in the memory 1105. The instructions 1109*a* may be executable by the processor 1103 to implement the methods disclosed herein. Executing the instructions 1109*a* may involve the use of the data 1107*a* that is stored in the memory 1105. When the processor 1103 executes the instructions 1109, various portions of the instructions 1109*b* may be loaded onto the processor 1103, and various pieces of data 1107*b* may be loaded onto the processor 1103.

The wireless communication device 1104 may also include a transmitter 1111 and a receiver 1113 to allow transmission and reception of signals to and from the wireless communication device 1104 via an antenna 1117. The transmitter 1111 and receiver 1113 may be collectively referred to as a transceiver 1115. The wireless communication device 1104 may also include (not shown) multiple transmitters, multiple antennas, multiple receivers, and/or multiple transceivers.

The wireless communication device 1104 may include a digital signal processor (DSP) 1121. The wireless communication device 1104 may also include a communications interface 1123. The communications interface 1123 may allow a user to interact with the wireless communication device 1104.

The various components of the wireless communication device 1104 may be coupled together by one or more buses, which may include a power bus, a control signal bus, a status signal bus, a data bus, etc. For the sake of clarity, the various buses are illustrated in FIG. 11 as a bus system 1119.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the figures. Where a term is used without a reference number, this is meant to refer generally to the term without limitation to any particular figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that may carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2-4, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation, and details of the systems, methods and apparatus described herein without departing from the scope of the claims.

What is claimed is:

1. A method for reducing power consumption on a wireless communication device, wherein the wireless communication device comprises a first stage active filter and a second stage active filter, the method comprising:
   obtaining a condition measurement that comprises a signal condition measurement;
   determining if the condition measurement is above a threshold;
   bypassing the second stage active filter if the condition measurement is above the threshold; and
   applying a passive filter after the second stage active filter if the condition measurement is above the threshold.

2. The method of claim 1, wherein the signal condition measurement is a wideband signal condition measurement.

3. The method of claim 1, wherein the condition measurement further comprises an interference condition measurement.

4. The method of claim 1, wherein the condition measurement is a combined condition measurement based on a signal condition measurement and an interference condition measurement.

5. The method of claim 1, wherein the threshold is one of a signal threshold, an interference threshold, and a combined signal threshold.

6. The method of claim 1, wherein the second stage active filter comprises an active stage.

7. The method of claim 6, wherein bypassing the second stage active filter further comprises:
   disabling power to the active stage; and
   opening a bypass circuit path to bypass the second stage active filter.

8. The method of claim 7, wherein opening the bypass circuit path comprises closing at least one bypass switch.

9. The method of claim 1, further comprising:
   obtaining an input signal;
   amplifying the input signal at the first stage active filter; and
   outputting a filtered signal.

10. The method of claim 9, wherein the input signal is a differential input signal with an inverted signal and a non-inverted signal.

11. The method of claim 10, further comprising applying a phase correction to the input signal if the condition measurement is above the threshold.

12. The method of claim 11, wherein applying the phase correction comprises crossing over the inverted signal to be the non-inverted signal and crossing over the non-inverted signal to be the inverted signal.

13. The method of claim 9, further comprising bypassing and disabling power to at least one additional active filter if the condition measurement is above the threshold.

14. The method of claim 9, further comprising:
   amplifying the input signal using a low-noise amplifier; and
   downconverting the input signal using a mixer.

15. The method of claim 1, wherein the passive filter rejects out-of-band signals.

16. The method of claim 1, wherein the condition measurement is obtained, in part, from an antenna.

17. A wireless device for reducing power consumption on a wireless communication device, wherein the wireless device comprises a first stage active filter and a second stage active filter, the wireless device comprising:
   a processor;
   memory in electronic communication with the processor; and
   instructions stored in the memory, the instructions being executable by the processor to:
   obtain a condition measurement that comprises a signal condition measurement;
   determine if the condition measurement is above a threshold;
   bypass the second stage active filter if the condition measurement is above the threshold; and
   apply a passive filter after the second stage active filter if the condition measurement is above the threshold.

18. The wireless device of claim 17, wherein the signal condition measurement is a wideband signal condition measurement.

19. The wireless device of claim 17, wherein the condition measurement is an interference condition measurement.

20. The wireless device of claim 17, wherein the condition measurement is a combined condition measurement based on a signal condition measurement and an interference condition measurement.

21. The wireless device of claim 17, wherein the threshold is one of a signal threshold, an interference threshold, and a combined signal threshold.

22. The wireless device of claim 17, wherein the second stage active filter comprises an active stage.

23. The wireless device of claim 22, wherein the instructions to bypass the second stage active filter further comprise instructions executable to:
  disable power to the active stage; and
  open a bypass circuit path to bypass the second stage active filter.

24. The wireless device of claim 23, wherein the instructions to open the bypass circuit path comprise instructions executable to close at least one bypass switch.

25. The wireless device of claim 17, further comprising instructions executable to:
  obtain an input signal;
  amplify the input signal at the first stage active filter; and
  output a filtered signal.

26. The wireless device of claim 25, wherein the input signal is a differential input signal with an inverted signal and a non-inverted signal.

27. The wireless device of claim 26, further comprising instructions executable to apply a phase correction to the input signal if the condition measurement is above the threshold.

28. The wireless device of claim 27, wherein the instructions to apply the phase correction comprise instructions executable to cross over the inverted signal to be the non-inverted signal and cross over the non-inverted signal to be the inverted signal.

29. The wireless device of claim 25, further comprising instructions executable to bypass and disable power to at least one additional active filter if the condition measurement is above the threshold.

30. The wireless device of claim 25, further comprising instructions executable to:
  amplify the input signal using a low-noise amplifier; and
  downconvert the input signal using a mixer.

31. The wireless device of claim 17, wherein the passive filter rejects out-of-band signals.

32. The wireless device of claim 17, wherein the condition measurement is obtained, in part, from an antenna.

33. A non-transitory computer readable medium for reducing power consumption on a wireless communication device, wherein the wireless communication device comprises a first stage active filter and a second stage active filter, the computer-program product comprising a non-transitory computer-readable medium having instructions thereon, the instructions comprising:
  code for causing a wireless communication device to obtain a condition measurement that comprises a signal condition measurement;
  code for causing the wireless communication device to determine if the condition measurement is above a threshold;
  code for causing the wireless communication device to bypass the second stage active filter if the condition measurement is above the threshold; and
  code for causing the wireless communication device to apply a passive filter after the second stage active filter if the condition measurement is above the threshold.

34. The non-transitory computer readable medium of claim 33, wherein the second stage active filter comprises an active stage.

35. The non-transitory computer readable medium of claim 33, wherein the instructions for causing the wireless communication device to bypass the second stage active filter further comprise instructions for causing the wireless communication device to:
  disable power to the active stage; and
  open a bypass circuit path to bypass the second stage active filter.

36. The non-transitory computer readable medium of claim 35, wherein the instructions for causing the wireless communication device to open the bypass circuit path comprise instructions for causing the wireless communication device to close at least one bypass switch.

37. The non-transitory computer readable medium of claim 33, further comprising instructions for causing the wireless communication device to:
  obtain an input signal;
  amplify the input signal at the first stage active filter; and
  output a filtered signal.

38. The non-transitory computer readable medium of claim 37, wherein the input signal is a differential input signal with an inverted signal and a non-inverted signal.

39. The non-transitory computer readable medium of claim 38, further comprising instructions for causing the wireless communication device to apply a phase correction to the input signal if the condition measurement is above the threshold.

40. The non-transitory computer readable medium of claim 39, wherein the instructions for causing the wireless communication device to apply the phase correction comprise instructions for causing the wireless communication device to cross over the inverted signal to be the non-inverted signal, and cross over the non-inverted signal to be the inverted signal.

41. An apparatus for reducing power consumption on a wireless communication device, wherein the wireless communication device comprises a first stage active filter and a second stage active filter, the apparatus comprising:
  means for obtaining a condition measurement that comprises a signal condition measurement;
  means for determining if the condition measurement is above a threshold;
  means for bypassing the second stage active filter if the condition measurement is above the threshold; and
  means for applying a passive filter after the second stage active filter if the condition measurement is above the threshold.

42. The apparatus of claim 41, wherein the second stage active filter comprises an active stage.

43. The apparatus of claim 41, wherein the means for bypassing the second stage active filter further comprise:
  means for disabling power to the active stage; and
  means for opening a bypass circuit path to bypass the second stage active filter.

44. The apparatus of claim 43, wherein the means for opening the bypass circuit path comprise means for closing at least one bypass switch.

45. The apparatus of claim 41, further comprising:
  means for obtaining an input signal;
  means for amplifying the input signal at the first stage active filter; and
  means for outputting a filtered signal.

46. The apparatus of claim 45, wherein the input signal is a differential input signal with an inverted signal and a non-inverted signal.

47. The apparatus of claim 46, further comprising means for applying a phase correction to the input signal if the condition measurement is above the threshold.

48. The apparatus of claim 47, wherein the means for applying the phase correction comprise:
  means for crossing over the inverted signal to be the non-inverted signal; and means for crossing over the non-inverted signal to be the inverted signal.

* * * * *